United States Patent
Furuya et al.

(10) Patent No.: US 8,330,872 B2
(45) Date of Patent: Dec. 11, 2012

(54) RECEIVING APPARATUS AND RECEIVING METHOD

(75) Inventors: Takahiro Furuya, Kanagawa (JP);
Yasunari Takiguchi, Tokyo (JP)

(73) Assignee: Sony Corporation, Tokyo (JP)

( * ) Notice: Subject to any disclaimer, the term of this patent is extended or adjusted under 35 U.S.C. 154(b) by 771 days.

(21) Appl. No.: 12/490,807

(22) Filed: Jun. 24, 2009

(65) Prior Publication Data
US 2009/0322963 A1 Dec. 31, 2009

(30) Foreign Application Priority Data

Jun. 30, 2008 (JP) ................................. 2008-171592

(51) Int. Cl.
*H04N 5/44* (2011.01)
*H04N 5/455* (2006.01)
*G06F 11/00* (2006.01)

(52) U.S. Cl. ....... 348/726; 348/725; 714/4.72; 714/704; 714/705; 714/706

(58) Field of Classification Search .......... 348/725–726; 714/47.2, 704–706
See application file for complete search history.

(56) References Cited

U.S. PATENT DOCUMENTS

| | | | | |
|---|---|---|---|---|
| 6,148,189 A | * | 11/2000 | Aschwanden | 455/234.1 |
| 6,227,351 B1 | | 5/2001 | Leisner | |
| 2005/0143030 A1 | * | 6/2005 | Kuriki et al. | 455/131 |
| 2006/0111066 A1 | * | 5/2006 | Thorpe | 455/232.1 |
| 2007/0118859 A1 | | 5/2007 | Tsukahara et al. | |
| 2009/0074118 A1 | * | 3/2009 | Cheng et al. | 375/345 |

FOREIGN PATENT DOCUMENTS

| | | |
|---|---|---|
| JP | 2001-510427 | 7/2001 |
| JP | 2002-359532 | 12/2002 |
| JP | 2005-159591 | 5/2005 |
| JP | 2005-130076 | 6/2005 |
| JP | 2006-217017 | 8/2006 |
| JP | 2007-028147 | 2/2007 |
| JP | 2007116358 | 5/2007 |
| JP | 2008-085594 | 4/2009 |

OTHER PUBLICATIONS

Japanese Office Action for corresponding JP 2008-171592 issued on Apr. 20, 2010.

* cited by examiner

*Primary Examiner* — Kristine Kincaid
*Assistant Examiner* — GiGi L Dubasky
(74) *Attorney, Agent, or Firm* — K&L Gates LLP

(57) ABSTRACT

A receiving apparatus is disclosed which includes: an amplification section configured to amplify a received signal including a digital broadcast signal; a mixing section configured to mix the received signal amplified by the amplification section with a selective frequency signal so as to acquire an intermediate frequency signal; a demodulation section configured to demodulate the intermediate frequency signal acquired by the mixing section so as to acquire a demodulated signal of the digital broadcast signal; and a control section configured to control the amplification factor of the amplification section in a manner bringing to a target level the signal level of the intermediate frequency signal acquired by the mixing section, the control section being further configured to set variably the target level in accordance with bit error status of the demodulated signal acquired by the demodulation section from the digital broadcast signal.

4 Claims, 3 Drawing Sheets

RECEIVING APPARATUS AND RECEIVING METHOD

CROSS REFERENCES TO RELATED APPLICATIONS

The present application claims priority to Japanese Priority Patent Application JP 2008-171592, filed in the Japan Patent Office on Jun. 30, 2008, the entire content of which is hereby incorporated by reference.

BACKGROUND

The present application relates to a receiving apparatus and a receiving method for use therewith, the receiving apparatus being used by diverse video equipment such as Television (TV) sets for receiving broadcast waves including those of digital TV broadcasts.

In recent years in Japan, in the United States, in Europe and elsewhere, efforts have been underway to promote TV broadcast digitization in order to offer high-definition and multichannel TV programs, multimedia services, and stable reception of TV signals by mobile units. FIG. 4 shows a typical structure of an existing receiving apparatus incorporated in TV sets and recording devices for receiving digital TV broadcasts. In the receiving apparatus shown in FIG. 4, a broadcast signal received by an antenna 11 is fed to a filter 12. The filter 12 is a band-pass filter (BPF) that extracts frequency bands of the broadcast signal. A received signal extracted by the filter 12 is forwarded to a variable amplification section 13. The amplification factor of the variable amplification section 13 is controlled by a command "a" based on the result of detection performed by a distortion detection section 19, to be described later.

The received signal amplified by the variable amplification section 13 is sent to a mixing section 15 through a filter 14. The filter 14 is another band-pass filter that extracts frequency bands of the broadcast signal. The mixing section 15 mixes the received signal coming from the filter 14 with a frequency signal supplied by a channel selection frequency signal generation section 16, thereby turning the received signal of a given frequency into an intermediate frequency signal. The frequency of the signal output by the channel selection frequency signal generation section 16 varies with reception frequency (i.e., received channel).

The intermediate frequency signal acquired by the mixing section 15 is forwarded to a variable amplification section 18 through a filter 17. The filter 17 is a band-pass filter that allows only the frequency band of the intermediate frequency signal to pass through. The intermediate frequency signal amplified by the variable amplification section 18 is fed to a demodulation section 20 for demodulation whereby a digital TV broadcast signal is obtained. The digital TV broadcast signal appears at an output terminal 21. The amplification factor of the variable amplification section 18 is controlled by a command "b" coming from the demodulation section 20. The amplification factor is controlled in such a manner as to keep within a predetermined range the level of the intermediate frequency signal being input to the demodulation section 20.

The intermediate frequency signal output by the mixing section 15 is fed to the distortion detection section 19. The distortion detection section 19 detects the signal level of the received intermediate frequency signal and compares the detected signal level with a predetermined target level. If the detected signal level is found deviating from the target level, a suitable command is sent to the variable amplification section 13 to vary its amplification factor in a manner bringing the signal level of the intermediate frequency signal to the target level through what is known as an automatic level control (AGC) circuit.

One such receiving apparatus for receiving TV broadcast signals is disclosed illustratively in Japanese Patent Laid-open No. 2007-116358.

SUMMARY

Where the receiving apparatus shown in FIG. 4 is to receive TV signals, the distortion detection section 19 detects the desired channel for reception as well as channels near that channel. Illustratively, where there is a desired channel DS as shown in FIG. 3A, a frequency band A on which an intermediate frequency signal can be detected by the distortion detection section 19 stretches from the desired channel DS to adjacent channels US. The detectable frequency band A is limited by the tracking characteristic of the receiving apparatus.

If the frequency band A detectable by the distortion detection section 19 includes adjacent channels US with their levels higher than the level of the desired channel DS as indicated in FIG. 3A, then the distortion detection section 19 correctly detects the adjacent channels US and provides control accordingly. That is, the distortion detection section 19 determines the amplification factor of the variable amplification section 13 by taking the levels of the adjacent channels into consideration. This makes it possible to suppress excessively high signal levels of the channels adjacent to the desired channel DS.

Suppose now that as shown in FIG. 3B, outside the frequency band A detectable by the distortion detection section 19 exist adjacent channels DS' with appreciably high signal levels. Such a case cannot be handled properly by the ordinary receiving apparatus. As indicated in FIG. 3B, if the undetectable adjacent channels DS' are found to have high levels while the signal levels within the detectable frequency band A are relatively low, then the amplification factor for the variable amplification section 13 is set to be inordinately high.

In the case above, the intermediate frequency signal obtained upon signal reception is significantly influenced by the high-level adjacent channels DS', which in turn distorts the signal received on the desired channel DS. If the received signal on the desired channel DS is distorted, then the digital broadcast signal of the received channel is prone to be demodulated erroneously.

The present application in an embodiment has been made in view of the above circumstances and provides inventive arrangements for properly receiving a desired frequency even if high-level signals cannot be detected on frequencies near the reception frequency.

An embodiment of the present application is practiced illustratively as follows: an amplification section is caused to amplify a received signal which includes a digital broadcast signal. The received signal thus amplified is mixed with a selective frequency signal so as to acquire an intermediate frequency signal. The intermediate frequency signal is demodulated in order to acquire a demodulated signal of the digital broadcast signal. The amplification factor of the amplification section is controlled in a manner bringing the signal level of the intermediate frequency signal to a target level. At the same time, the target level is set variably in accordance with bit error status of the demodulated signal of the digital broadcast signal.

In the above-outlined structure, the amplification section for amplifying the received signal has its amplification factor set variably in keeping with the received signal level detected by a control section, so that the amplification factor is controlled automatically by a so-called automatic gain control function. Where the bit error status of the demodulated signal derived from the received digital broadcast signal has worsened, the state of reception is likely to have deteriorated as well, affected by signals of other channels in particular. The adverse effects of the other signals may be bypassed and the signal level may be kept normal by variably setting the target level for controlling the amplification factor of the amplification section in keeping with the bit error status of the demodulated signal derived from the digital broadcast signal.

According to an embodiment, as outlined above, the target level for controlling the amplification factor of the amplification section is set variably in accordance with the bit error status of the demodulated signal derived from the digital broadcast signal, whereby an appropriate signal level is maintained free of the adverse effects of the other signals. For example, if the bit error status is found to exceed a predetermined threshold level, the target level of the amplified signal is lowered. A lowered target level brings the received signal level to an appropriate level. That in turn makes it possible to improve the bit error status of the demodulated signal derived from the received digital broadcast signal.

Additional features and advantages are described herein, and will be apparent from the following Detailed Description and the figures.

DETAILED DESCRIPTION

The present application will be described below in greater detail with reference to the accompanying drawings according to an embodiment:
1. Typical structure (in reference to FIG. 1)
2. Typical workings in reference to FIG. 2)
3. Explanation of the effects (in reference to FIGS. 3A and 3B)
4. Variations

[Typical Structure]

Figure 1:
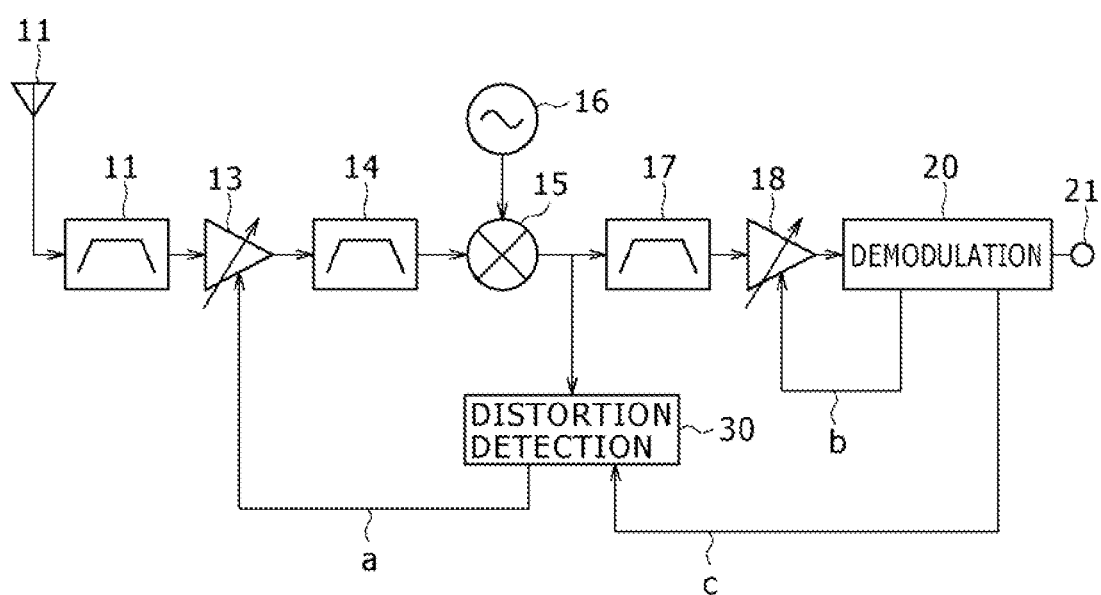
FIG. 1 is a block diagram showing a typical structure of a receiving apparatus practiced as one embodiment of the present application.
Figure 4:
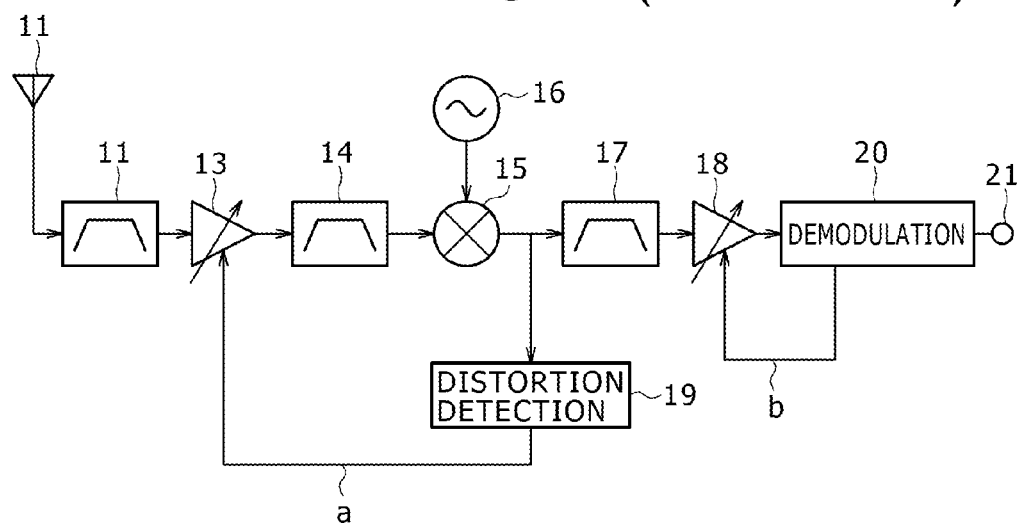
FIG. 4 is a schematic view showing how an ordinary receiving apparatus is structured.

FIG. 1 is a block diagram showing a typical structure of a receiving apparatus practiced as one embodiment of the present application. In FIG. 1, the component parts of the receiving apparatus with their functions identical or corresponding to those of their counterparts in FIG. 4 are designated by like reference numerals. In the structure of FIG. 1, a received signal acquired by an antenna 11 is supplied to a filter 12. The filter 12 is a band-pass filter (BPF) that extracts frequency bands of the broadcast signal. The received signal extracted by the filter 12 is supplied to a variable amplification section 13. The variable amplification section 13 has its amplification factor controlled in accordance with the result of detection performed by a distortion detection section 30, to be described later.

The received signal amplified by the variable amplification section 13 is supplied to a mixing section 15 through a filter 14. The filter 14 is another band-pass filter that extracts frequency bands of the broadcast signal. The mixing section 15 mixes the received signal coming from the filter 14 with a frequency signal supplied by a channel selection frequency signal generation section 16, whereby the received signal of a predetermined frequency is obtained as an intermediate frequency signal. The frequency of the signal output by the channel selection frequency signal generation section 16 varies with the reception frequency (i.e., received channel).

The intermediate frequency signal obtained by the mixing section 15 is fed to a variable amplification section 18 through a filter 17. The filter 17 is a band-pass filer that allows only the frequency band of the intermediate frequency signal to pass through. The intermediate frequency signal amplified by the variable amplification section 18 is fed to a demodulation section 20 for demodulation whereby a digital TV broadcast signal is obtained. The digital TV broadcast signal appears at an output terminal 21. The amplification factor of the variable amplification section 18 is controlled by the demodulation section 20 in such a manner as to keep within a predetermined range the level of the intermediate frequency signal being input to the demodulation section 20. The demodulation section 20 is further structured to output data "c" about the bit error status of the digital TV broadcast signal demodulated by the demodulation section 20, the data "c" being fed to the distortion detection section 30. The data "c" about the bit error status is sent to the distortion detection section 30 in the form of bit error rate data.

The intermediate frequency signal output by the mixing section 15 is fed to the distortion detection section 30. The distortion detection section 30 detects the signal level of the received intermediate frequency signal and compares the detected signal level with a predetermined target level. If the detected signal level is found deviating from the target level, a suitable command is sent to the variable amplification section 13 to vary its amplification factor in a manner bringing the signal level of the intermediate frequency signal to the target level through what is known as an automatic level control (AGC) circuit.

With this embodiment, the distortion detection section 30 is structured to set variably the target level for determining the detected signal level through the use of the bit error rate data "c" supplied by the demodulation section 20. Illustratively, if the bit error rate is found to have worsened beyond a predetermined threshold level, then the target level of the intermediate frequency signal is lowered. If lowering the target level of the amplified signal fails to improve the bit error rate of the received signal, then the target level of the intermediate frequency signal is raised. These control processes will be discussed later in more detail.

[Typical Workings]

Figure 2:
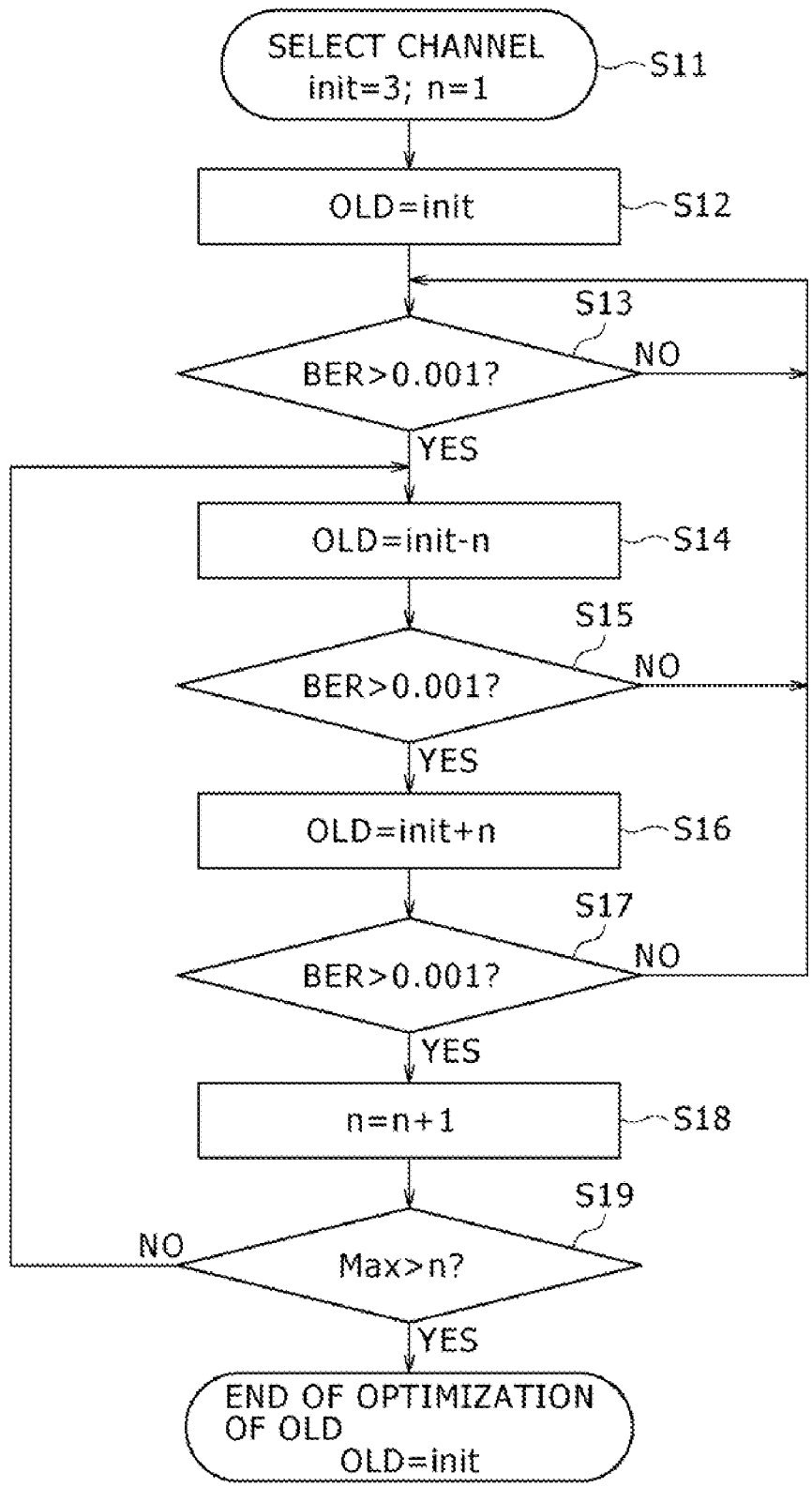
FIG. 2 is a flowchart of steps in which an embodiment typically works.

Explained below in reference to the flowchart of FIG. 2 is how the distortion detection section 30 in FIG. 1 sets variably the target level for determining the detected signal level. In the flowchart of FIG. 2, "init" stands for the initial value of the target level OLD in effect upon channel selection; "BER" denotes the bit error rate of the demodulated signal; "OLD" represents the set value of the target level OLD; "n" indicates the amount in which to shift the set value of the target level OLD; and "max" stands for the maximum amount in which the set value of the target level OLD may be shifted.

If the distortion detection section 30 has its own operation control function, then the processing of the flowchart in FIG. 2 is carried out by a control function unit of the distortion detection section 30. Alternatively, the processing may be performed by a control section (not shown) for controlling the entire receiving apparatus shown in FIG. 1.

In step S11 of FIG. 2, the initial value "init" of the target level OLD is established at the start of channel selection, and the value "n" in which to shift the OLD set value is initialized.

Following the initialization, step S12 is reached and the channel selection operation is started. The value established as the initial value "init" in step S11 is set as the target level OLD.

In step S13, the bit error rate BER of the demodulation section 20 in the current state is ascertained. A check is made to determine whether the bit error rate is greater than 0.001. If the bit error rate is not found to be larger than 0.001 (i.e., less than 0.001), then the check in step S13 is repeated so as to ascertain that the bit error rate BER has not worsened.

If in step S13 the bit error rate BER is found to be larger than 0.001, then step S14 is reached and the target level OLD is set to the initial value "init" minus the amount "n" in which to shift the set value of the target level OLD. This process reduces the amplification factor of the amplification section 13 and lowers the output level of the intermediate frequency signal, thereby improving distortion.

In step S15, the bit error rate BER in the current state is ascertained and a check is made to determine whether the bit error rate is larger than 0.001. If the bit error rate is not found to be larger than 0.001 (i.e., less than 0.001), then control is returned to step S13.

If in step S15 the bit error rate BER is found to be larger than 0.001, then step S16 is reached and the target level OLD is set to the initial value "init" plus the amount "n" in which to shift the set value of the target level OLD. This process boosts the amplification factor of the amplification section 13 and raises the output level of the intermediate frequency signal, thereby improving adjacency characteristic.

In step S17, the bit error rate BER in the current state is ascertained and a check is made to determine whether the bit error rate is larger than 0.001. If the bit error rate BER is not found to be larger than 0.001 (i.e., less than 0.001), then control is returned to step S13.

If in step S17 the bit error rate BER is found to be larger than 0.001, then step S18 is reached and the amount "n" in which to shift the set value of the target level OLD is incremented by "1" so that the value of the target level OLD may be shifted in a larger amount than before.

In step S19, a check is made to determine whether the amount "n" set in step S18 as the amount in which to shift the set value of the target level OLD remains lower than a predetermined maximum value. If the shift amount "n" is found to be lower than the maximum value, control is returned to step S14. If the shift amount "n" is found in excess of the maximum value, which means the adjustment of the target level OLD has failed to improve the bit error rate BER. In that case, the target level OLD is initialized and the OLD optimizing process is brought to an end.

[Explanation of the Effects]

Through the control process outlined by the flowchart in FIG. 2, the target level of the received signal level for amplifying the received signal is varied if the bit error rate is not found normal. This improves the bit error status of the demodulated signal derived from the received digital broadcast signal. Under the process, the amplification section for amplifying the received signal has its amplification factor set variably in keeping with the received signal level detected by the control section in what is known as an automatic gain control function unit for automatic amplification factor adjustment. When the bit error status of the demodulated signal derived from the received digital broadcast signal worsens, there is a possibility that the state of reception has deteriorated as well primarily due to the adverse effects of the signals on other channels. In that case, the target level for controlling the amplification factor of the amplification section is set variably in accordance with the bit error status of the demodulated signal of the digital broadcast signal, whereby a suitable signal level free of the adverse effects of the other signals is acquired.

More specifically, when the bit error status is found to have exceeded a predetermined threshold level, the target level of the amplified signal is reduced. Lowering the target level can bring the received signal level to normal, which can improve the bit error status of the demodulated signal of the received digital broadcast signal.

Figure 3A:
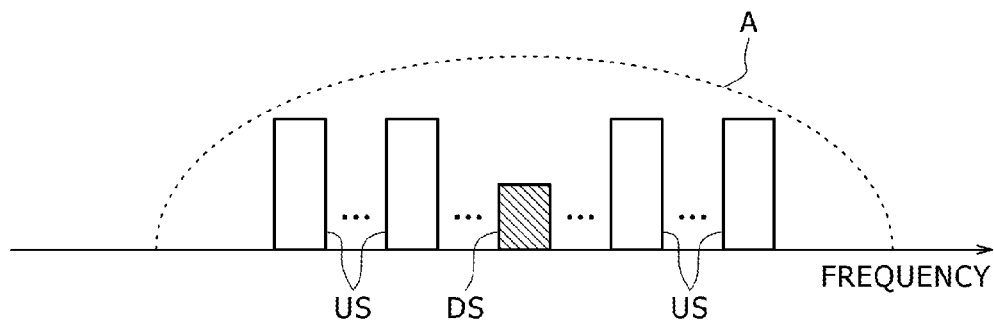
FIGS. 3A and 3B are schematic views each showing a typical receiving state of the receiving apparatus.
Figure 3B:
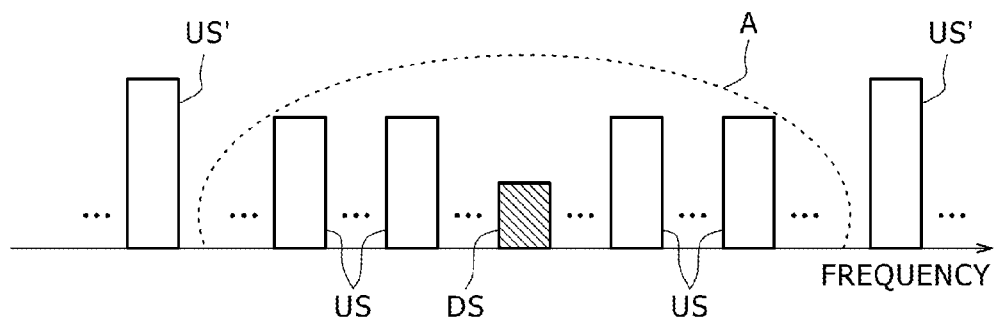

An improved state derived from the lowered target level is shown illustratively in FIG. 3B. Meanwhile, it is assumed that there is a desired channel DS with its frequency taken as that of an intermediate frequency signal as shown in FIG. 3A. It is also assumed that a frequency band A on which the intermediate frequency signal can be detected by the distortion detection section 19 stretches from the desired channel DS to adjacent channels US. The detectable frequency range A is limited by the tracking characteristic of the receiving apparatus.

As shown in FIG. 3A, if there exist adjacent channels US with their levels higher than the level of the desired channel DS within the frequency band A detectable by the distortion detection section 19, the distortion detection section 19 can correctly detect the adjacent channels US and exercise control accordingly. That is, the amplification factor of the variable amplification section 30 is determined with the levels of the adjacent channels US taken into consideration. This suppresses excessively high signal levels of the channels adjacent to the desired channel DS. Up to this point, control is exercised without varying the target level, and the control-related workings are the same as those of the ordinary receiving apparatus shown in FIG. 4.

Suppose now that as shown in FIG. 3B, adjacent channels DS' having high levels exist outside the frequency band A detectable by the distortion detection section 30. In this case, the demodulated signal of the desired channel DS could be distorted under the influence of the high-level adjacent channels DS'; the bit error rate could then deteriorate if left unmodified. According to the above preferred embodiment, the deteriorating bit error rate is detected and the target level is lowered accordingly so that the bit error may be improved.

If lowering the target level fails to improve the bit error rate, then the target level is raised as an opposite move to solve the problem. If the raised target level leads to an improved bit error rate, then the reception is continued in that state. In this manner, an appropriate amplification level is established on the basis of the actual bit error rate of the received signal, whereby a suitable state of reception is provided.

Variations of the Embodiment

In the foregoing description, this application was shown to be embodied in the form of a receiving apparatus of which the structure is shown in FIG. 1. However, this is not limitative of the embodiment of the present application. Alternatively, the embodiment may be practiced as a receiving apparatus (e.g., tuner) incorporated in such diverse video equipment as TV sets and video recording devices for receiving TV broadcasts. As another alternative, the embodiment may be implemented as a stand-alone receiving apparatus that may acquire received signals (video and audio signals) and feed them to other video equipment.

The values given in the flowchart of FIG. 2 (initial value, bit error rate, etc.) are only for illustration purposes and are not limitative of the present application.

The above-described embodiment was explained as a reception-only receiving apparatus constituted by hardware. Alternatively, the embodiment may be implemented by a personal computer designed for diverse data processing and equipped with a board or a card for carrying out communication processing equivalent to what was shown executed by the above-described receiving apparatus. That computer may be arranged to have a suitable program run on it for performing similar reception processing of radio-frequency hardware using the steps given in the flowchart of FIG. 2. The program for carrying out these steps may be distributed on appropriate storage media.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A receiving apparatus comprising:
   an amplification section configured to amplify a received signal which includes a digital broadcast signal;
   a mixing section configured to mix the received signal amplified by the amplification section with a selective frequency signal so as to acquire an intermediate frequency signal;
   a demodulation section configured to demodulate the intermediate frequency signal acquired by the mixing section so as to acquire a demodulated signal of the digital broadcast signal; and
   a control section configured to control the amplification factor of the amplification section in a manner bringing to a target level the signal level of the intermediate frequency signal acquired by the mixing section, the control section being further configured to set variably the target level in accordance with bit error status of the demodulated signal acquired by the demodulation section from the digital broadcast signal,
   wherein the bit error status of the demodulated signal is a bit error rate,
   if the bit error rate is found to exceed a predetermined threshold level, then the control section lowers the target level, and
   if the bit error rate is not improved after the target level was lowered when the bit error rate was found in excess of the predetermined threshold value, then the control section raises the target level.

2. The receiving apparatus according to claim 1, wherein if the bit error rate is not improved after the target level was raised, then the control section initializes the target level.

3. A receiving method comprising the steps of:
   causing an amplification section to amplify a received signal which includes a digital broadcast signal;
   mixing the received signal thus amplified with a selective frequency signal so as to acquire either an intermediate frequency signal or a baseband signal;
   demodulating either the intermediate frequency signal or the baseband signal so as to acquire a demodulated signal of the digital broadcast signal;
   controlling the amplification factor of the amplification section in a manner bringing to a target level the signal level of either the intermediate frequency signal or the baseband signal;
   setting variably the target level in accordance with bit error status of the demodulated signal derived from the digital broadcast signal, the bit error status of the demodulated signal corresponding to a bit error rate;
   lowering the target level if the bit error rate is found to exceed a predetermined threshold level; and
   raising the target level if the bit error rate is not improved after the target level was lowered when the bit error rate was found in excess of the predetermined threshold value.

4. A receiving apparatus comprising:
   amplification means for amplifying a received signal which includes a digital broadcast signal;
   mixing means for mixing the received signal amplified by the amplification means with a selective frequency signal so as to acquire an intermediate frequency signal;
   demodulation means for demodulating the intermediate frequency signal acquired by the mixing means so as to acquire a demodulated signal of the digital broadcast signal; and
   control means for controlling the amplification factor of the amplification means in a manner bringing to a target level the signal level of the intermediate frequency signal acquired by the mixing means, the control means being further configured to set variably the target level in accordance with bit error status of the demodulated signal acquired by the demodulation means from the digital broadcast signal, wherein the bit error status of the demodulated signal corresponds to a bit error rate, and
   the control means is to lower the target level if the bit error rate is found to exceed a predetermined threshold level and raise the target level if the bit error rate is not improved after the target level was lowered when the bit error rate was found in excess of the redetermined threshold value.

* * * * *